United States Patent [19]

Morris et al.

[11] Patent Number: 5,251,085
[45] Date of Patent: Oct. 5, 1993

[54] PIVOTABLE ARM ASSEMBLY WITH REDUCED THERMAL DISTORTION

[75] Inventors: Frank I. Morris, San Jose; King L. Wong, Cupertino; Robert L. Talbot, San Jose, all of Calif.

[73] Assignee: Maxtor Corporation, San Jose, Calif.

[21] Appl. No.: 731,548

[22] Filed: Jul. 17, 1991

[51] Int. Cl.⁵ .............................................. G11B 5/55
[52] U.S. Cl. .................................... 360/106; 360/98.01
[58] Field of Search ............ 360/104, 106, 105, 98.01, 360/98.02

[56] References Cited

U.S. PATENT DOCUMENTS

| | | | |
|---|---|---|---|
| 4,196,456 | 4/1980 | Manzke et al. | 360/106 |
| 4,555,189 | 11/1985 | Donkin | 360/106 |
| 4,660,110 | 4/1987 | Iida et al. | 360/98 |
| 4,682,255 | 7/1987 | Sleger et al. | 360/106 |
| 4,691,258 | 9/1987 | Kobayashi et al. | 360/97 |
| 4,814,908 | 3/1989 | Schmitz et al. | 360/77.02 |
| 4,860,135 | 8/1989 | Cain | 360/97.2 |
| 4,924,337 | 5/1990 | Repphun et al. | 360/128 |
| 4,949,194 | 8/1990 | MacPherson et al. | 360/104 |
| 4,969,058 | 11/1990 | Williams et al. | 360/77.03 |
| 4,979,062 | 12/1990 | Stefansky et al. | 360/97.02 |
| 4,980,786 | 12/1990 | O'Sullivan et al. | 360/97.03 |
| 4,992,899 | 2/1991 | Kaczeus et al. | 360/106 |
| 4,994,931 | 2/1991 | Foote | 360/106 |
| 5,005,089 | 4/1991 | Thanos et al. | 360/77.08 |
| 5,050,026 | 9/1991 | Gross | 360/106 |

Primary Examiner—Paul M. Dzierzynski
Assistant Examiner—Kiet T. Nguyen

[57] ABSTRACT

A pivoting armset assembly is disclosed herein that has substantially reduced misregistration due to thermal effects. The armset assembly is useful for an actuator in a magnetic disk drive; the preferred embodiment is an armset assembly in an actuator for reading from, or writing to, one or more magnetic storage disks. The armset assembly, constructed according to the present invention, includes an armset having a smooth bore aligned with the axis of rotation. The assembly further includes a sleeve having a smooth outer perimeter with a size for an interference fit within the smooth bore. An anti-friction material is positioned between the smooth sleeve and the smooth bore. The assembly also includes a bearing disposed within the sleeve, to pivot the arm about its axis. The coefficient of friction between the bore and sleeve is high enough that they rotate together as a unit throughout their operating temperature range, without creating radial clearance between the arm and the sleeve, but low enough to permit slight axial adjustments during thermal expansion in which the bore expands at a different rate than the sleeve. Preferably, the anti-friction material is disposed on the sleeve, and includes a coating of tungsten disulfide ($WS_2$). The coefficient of friction can be selected by a choice of the heaviness of the interference fit, the type of the anti-friction material, and the smoothness of the bore and the sleeve.

18 Claims, 2 Drawing Sheets

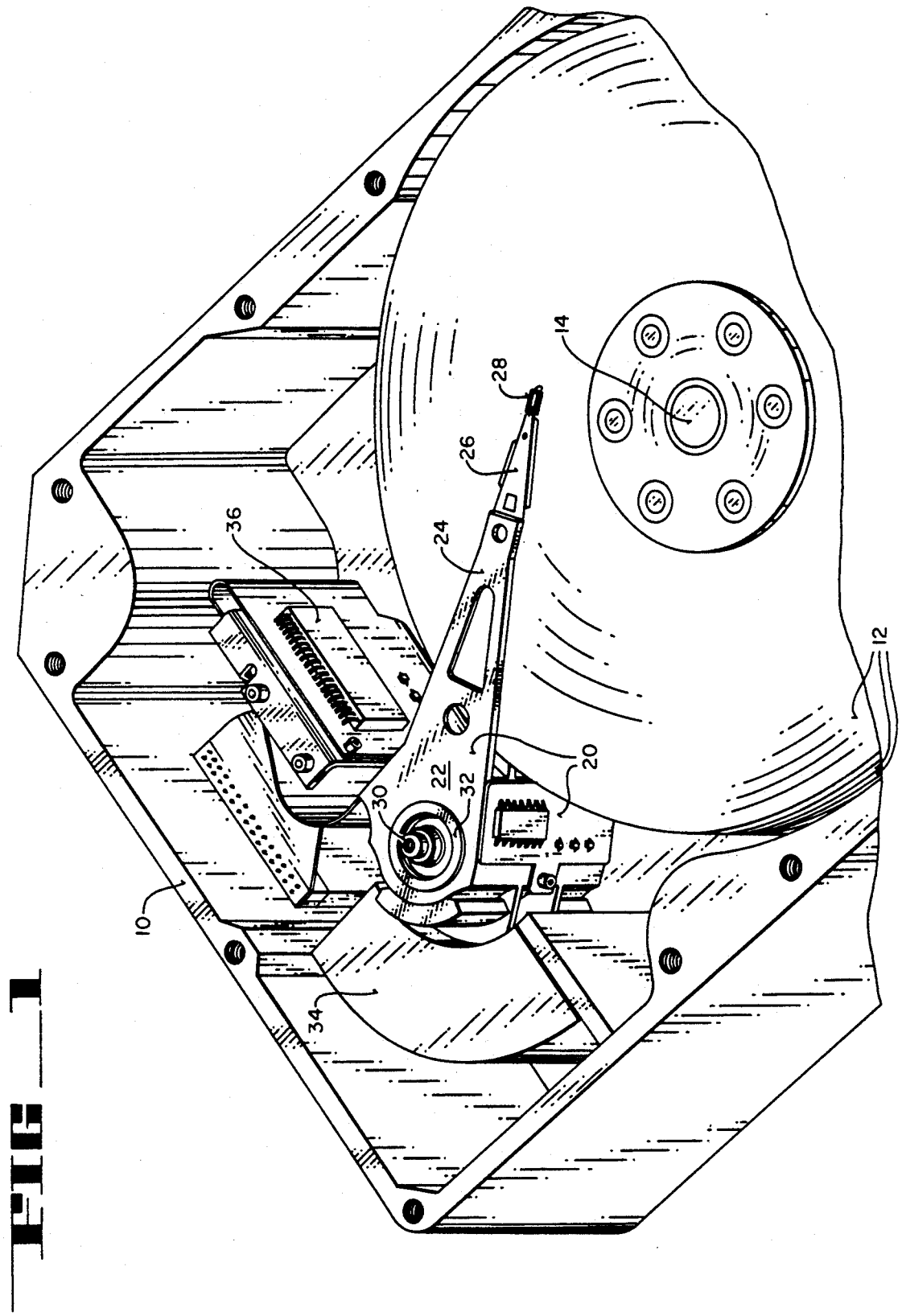
FIG_1

FIG_2
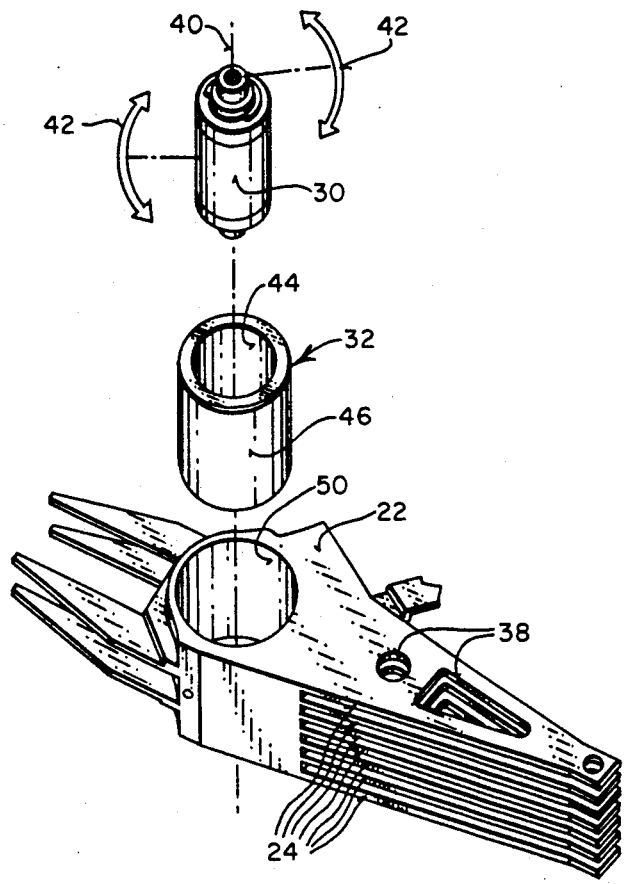
FIG_3
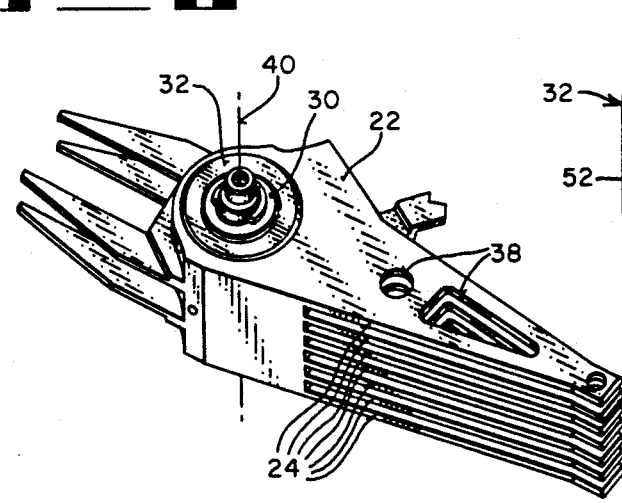
FIG_4
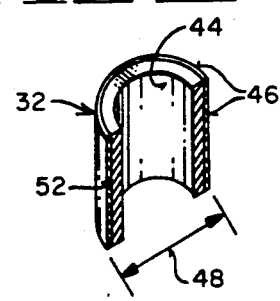

PIVOTABLE ARM ASSEMBLY WITH REDUCED THERMAL DISTORTION

BACKGROUND OF THE INVENTION

1. Field of the Invention

The present invention relates to actuators in disk drives, and to compensation for thermal expansion of the actuators. Particularly, the present invention relates to rotary actuators for quickly reading from, or writing to, a disk drive, and specifically to low inertia rotary actuators with reduced thermal misregistration throughout their operating temperature range.

2. Description of Related Art

An actuator is an assembly of components for a disk drive assembly that reads data from, and writes data to, one or more storage disks. The storage disks are typically of the magnetic type, although other types of disks can be used. For a magnetic disk drive assembly, an actuator is typically a pivoting assembly that includes an armset having two or more arms, a magnetic transducer head affixed on each of the arms, a voice coil or stepper motor for rotating the armset, and a bearing aligned with an axis about which the armset rotates. The actuator may include one or more pairs of arms. For single disk systems, the magnetic disk is positioned between a pair of arms; for multiple disk systems, each disk is positioned between one of a number of pairs of arms. The magnetic heads on the arms are positioned just off the surface of the respective disk, and on either side. The armset is rotatable to move the heads over the surface of the disk, in order to access a particular track on the disk.

Disk tracks are laid out in a series of concentric circles. Any location on the disk can be accessed by a combination of rotating the disk and moving the magnetic heads from track to track. The data stored on the disk is very dense; for example, forty megabytes (4 million bytes, each having 8 bits) can be stored on a hard disk having a diameter of only a few inches. Due to the high density of data, very precise head positioning is necessary to read a particular bit of data.

The environment in which the disk drive is positioned, such as the inside of a computer, contains many heat producing elements, and the temperature of the disk drive can increase substantially during the course of a computing session. Therefore, disk drives are usually specified for operation within a wide temperature range, such as 5° to 50° Centigrade.

In many prior art systems, thermal effects can shift the position of the heads off track. Thermal expansion occurs in all materials to an extent quantified by the thermal expansion coefficient of the material. Accordingly, many prior art actuators can and do expand and distort with temperature changes during the course of a computing session. Expansion can cause the heads to be misaligned with the disk tracks causing problems in reading and writing data. This problem may be termed "thermal misregistration".

In order to compensate for thermal misregistration, many systems have been developed, some mechanical or electrical in nature, and others software related. The software related compensation systems typically use one or more servo tracks recorded on the disk to provide a tracking reference. For example, Thano et al. (U.S. Pat. No. 5,005,089) discloses a system for thermal compensation of a disk drive, including a temperature sensor, two prerecorded data tracks for calibration, and software that performs the calibration with the actuator and compensates its position for thermal misregistration. The temperature sensor is periodically checked and recalibration is carried out when the drive temperature changes. As another example using multiple disks in a stacked configuration, Repphun et al. (U.S. Pat. No. 4,924,337) discloses a servo head, separate from the data heads, for reading tracking information from a middle disk. The servo information is used to make certain that the head drive assembly, or actuator, positions the heads above the center of the data track regardless of thermal effects or other factors. In general, software based systems for correcting misregistration have drawbacks including the amount of time lost sensing the misregistration, and the amount of time lost making adjustments to compensate. Furthermore, additional costs are associated with software, both in development cost, memory space, and computer time that could be better utilized.

Some prior art systems for thermal compensation include additional mechanical or electrical elements for thermal compensation. For example, Schmitz (U.S. Pat. No. 4,814,908) discloses an arm having a heating element embedded therein. The heating element is positioned so that the linear expansion or contraction of the arm resulting from the temperature rise or drop due to the amount of heat applied to the arm by the heating element will move the transducer across the track. During tracking, a circuit varies the amount of power applied to the heating element so that the transducer is kept over the center of the track. As another example, Cain (U.S. Pat. No. 4,860,135) discloses placing a slot in the edge of at least one arm and placing a body with a different thermal coefficient into the slot with an interference fit. The temperature coefficients of the body and the arm are chosen to cause temperature-induced distortion of the arm in which the body is placed. This distortion corrects at least in part the misalignment in the arm assembly. As a further example, a temperature compensating mechanism disclosed by Kobayashi et al. includes spring elements, attached at spaced locations to the actuator assembly, and associated with a cooperating pulley that drives a band. Temperature variation is compensated by proper selection of the spring coefficient of the band, spring, and connector structure between the pulley and one of the spaced locations, and the spring coefficient between the pulley and another location. As yet another example, Williams et al. (U.S. Pat. No. 4,969,058) discloses a configuration which is said to nullify the effects of thermal and hygroscopic expansion if certain structural members in a fine position actuator specified therein are constructed of a material that satisfies an equation provided therein.

Some systems attempt to address the thermal expansion issue by minimizing the temperature change or temperature gradients, thereby minimizing thermal expansion effects. An example of this approach is Iida et al. (U.S. Pat. No. 4,660,110) which discloses a magnetic disk storage device with an inner shroud having a multiplicity of small apertures for releasing heat to the outside, which are said to avoid thermal off-track of the magnetic heads. Another example is provided by Stefansky et al. (U.S. Pat. No. 4,979,062), which discloses a two-dimensional base plate. Misalignment of the heads and the disks is said to be prevented by the two-dimensional structure which has increased structural rigidity during thermal expansion over a three-dimensional structure, which flexes unpredictably. Another example is provided by O'Sullivan et al. (U.S. Pat. No. 4,980,786) which discloses multiple approaches to the problem of thermal expansion, including a carefully constructed "box within a box", and a symmetrical design with components that have thermally matched expansion coefficients.

These designs may be useful in reducing the thermal expansion problem; however, regardless of box construction, temperature changes are inevitable to some extent, unless a completely controlled environment (i.e., refrigeration) were used to maintain a constant temperature. For most uses, it is simply impractical and not cost effective to provide a such temperature controlled environment.

Symmetrical construction using thermally matched components, as disclosed in some of the above patents, is impractical for many typical disk drive components due to the properties of the different materials. In many actuator assemblies, the actuator armset is positioned to pivot about bearings that are positioned in a bore provided in the armset. The Stefansky et al. reference discloses such an arrangement. Thermal expansion matching is simply not possible in that actuator, because the bearing material has different properties than the armset material. The bearing should be made of a hard, durable material with excellent wear properties, such as steel, that can be formed to precise dimensions and case-hardened, and does not deform under stress. On the other hand, the armset should be made of a lightweight, low inertia material, such as magnesium or aluminum, that has good damping characteristics to avoid instabilities in the closed loop servo control system. A low inertia armset can move quickly to the next track for fast data access.

The different materials have different thermal expansion coefficients; steel has an expansion coefficient that is about one-half that of magnesium. As temperature increases, the dimensions of the bore increase twice as fast as the dimensions of the steel bearing. If a steel bearing were to be slip fit into the bore at room temperature, then at higher temperatures the bearing would become "sloppy", and move about as the bore's dimensions become larger than the bearing's dimensions. Steel bearings are available in an integral form, which includes the bearings positioned within a cylinder so that the cylinder rotates around the axis. The steel integral bearing requires an interference (i.e., a press) fit within the armset bore, so that it does not become loose, or slip during operation. In other words, during manufacture, the bearing must be fit very tightly into the armset bore so that when temperatures increase during operation, a tight fit is maintained. Press fitting a bearing has caused problems in manufacturing actuators; many bearings were distorting and malfunctioning as a result of being compressed too tightly. This problem has caused low yields in manufacturing.

It would be an advantage to provide an actuator with simple, reliable thermal compensation included therein, and it would be a further advantage if the actuator could be manufactured with a high yield of usable product.

SUMMARY OF THE INVENTION

The present invention provides a pivoting armset assembly for a disk drive actuator that can operate throughout a typical operating temperature range with substantially reduce misregistration due to thermal effects. An actuator, constructed according to the present invention, may require no additional thermal compensation.

According to the present invention, an anti-friction material is provided between a sleeve and a bore in the armset, in order to provide a coefficient of friction low enough to permit slippage during thermal expansion. However, the sleeve and the bore are press fitted together with an interference fit heavy enough so that they do not slip or rotate during normal operation within the operating temperature range of the disk drive. The coefficient of friction between the adjacent surfaces of the sleeve and the bore is chosen by a combination of the type of anti-friction coating and heaviness of the interference fit, so that the radial clearance between arm and sleeve prevents slippage, except axial slippage resulting from thermal expansion that would be expected within the operating temperature range of the disk drive.

The net effect is to minimize the stress buildup at the interface of the sleeve and the armset and thus reduce the amount of distortion of the armset.

An armset assembly for an actuator, constructed according to the present invention, includes an armset pivoting about an axis. The armset has a smooth bore aligned with the axis. The smooth bore extends through the armset, which is preferably constructed of a low inertia material such as magnesium that has good damping characteristics. The armset assembly further includes a sleeve having a smooth outer perimeter with a size for an interference fit within the smooth bore. The armset comprises a material that has a first expansion coefficient that is substantially different from the second expansion coefficient of the sleeve. An anti-friction material is positioned between the smooth sleeve and the smooth bore. The assembly also includes a bearing having a shape and position to rotate the sleeve and the arm about the axis. The bore and sleeve fit together with an interference fit tight enough that they rotate together as a unit throughout their operating temperature range, without substantial slipping. However, the anti-friction coating provides a low coefficient of friction between the bore and sleeve. The low coefficient of friction aids in slight positional adjustments during thermal expansion in which the bore expands at a different rate than the sleeve. Preferably, the anti-friction material is disposed on the sleeve, and includes a coating of tungsten disulfide ($WS_2$).

The preferred embodiment is an armset assembly in an actuator for reading from, or writing to, one or more magnetic storage disks. The armset includes one or more arms, each arm having at least one magnetic head in the Head Gimbal Assembly (HGA) positioned thereon for reading or writing to a magnetic disk. The actuator rotates about its axis to position the magnetic heads to read from one of a number of tracks provided on the storage disks. In order to provide fast access to any track, the material in the armset includes magnesium, which has a low density relative to its strength, low inertia, and good damping characteristics in order to enhance stability of the closed-loop servo control system. The cylindrical bore extending through the armset aligned with the rotational axis of the actuator is also very smooth, for a reduced coefficient of friction. The cylindrical sleeve comprises a hard, durable material, such as case-hardened steel, having an expansion coefficient that is less than the expansion coefficient of magnesium by about a factor of two. The sleeve has an anti-friction coating of tungsten disulfide (WS$_2$) provided on the outside surface and polished to be very smooth to further reduce the coefficient of friction. A cartridge bearing is positioned axially within the sleeve so that the armset is rotatable about its axis.

BRIEF DESCRIPTION OF THE DRAWINGS

FIG. 1 is a perspective view of a portion of a multi-disk drive assembly.

FIG. 2 is a perspective exploded view of an armset for multiple disks, with a sleeve and a bearing exploded from the bore.

FIG. 3 is a perspective view of an assembled armset, sleeve, and bearing.

FIG. 4 is a cross-sectional view of the sleeve coated with an anti-friction material.

DETAILED DESCRIPTION OF THE INVENTION

The invention is best understood by reference to the figures wherein like parts are designated with like numerals throughout.

The present invention is embodied in a multi-disk magnetic disk drive that may, for example, be positioned in a computer. An exemplary multi-disk drive system is illustrated in perspective in FIG. 1. Although the preferred embodiment will be described wtih reference to a multi-disk magnetic disk drive system, the invention can be applied to a single disk magnetic drives, as well as to other typed of drives and arm assemblies for which thermal misregistration is a problem.

In FIG. 1, a housing 10 holds a plurality of magnetic disks 12 in a conventional stacked arrangement. The disks 12 are rotatable around a spindle 14, by a conventional motor (not shown). An actuator assembly, shown generally at 20, includes an armset 22 which comprises a plurality of arms 24. Each arm 24 is attached to a head connecting member 26. A magnetic transducer head 28 is attached to each member 26.

In operation, the head 28 is caused to move from track to track by pivoting the armset 22 about a bearing 30. A sleeve 32, which will be described subsequently in more detail, is disposed between the bearing 30 and the armset 22. The armset 22 is pivoted by applying current to a conventional voice coil assembly, shown generally at 34. Conventional control circuitry is shown at 36.

FIG. 2 is a perspective view of the sleeve 32 and the bearing 30 exploded from the armset 22. FIG. 3 is a perspective view of the armset 22, the bearing 30, and the sleeve 32 assembled together. The armset 22 is preferably constructed of a lightweight, low inertia material, preferably magnesium, that has good damping characteristics. Other materials, such as aluminum, ceramics, or composites may be used. In the preferred embodiment, the armset 22 is manufactured from a single block of magnesium. The arms 24 may comprise one or more holes 38 whose purpose is to reduce the inertia that slows disk access times. The armset 22, shown in FIGS. 2 and 3, has seven arms for reading from six magnetic disks. Specifically, a magnetic disk 12 (FIG. 1) is positioned between each of the opposing arms 24, and therefore the armset 22 in FIGS. 2 and 3 can read from both sides of six magnetic disks.

The bearing 30 is preferably a standard cartridge type bearing with the following specifications:
1. Radial Load Capacity:70lbs.
2. Axial Load Capacity: 45lbs.
3. Maximum Friction Torque: 4.0 Gram Cm.
4. Axial Preload: 1.5–2 lbs.
5. Lubricant: Nig-Ace W LY255, 20-25% Full (Equiv).
6. Bearings to be NHBB (NMB) DDRI-614ZZHA5P-5BLY255.
7. Must withstand $100 \times 10^8$ in 15° repetitive cycles without bearing damage (Fretting).
8. Contact Angle 12°.
9. Sleeve and shaft material to be 416 stainles steel, bearings to be 440-C stainless RC 58-62.

The bearing has been produced by NMB Corporation, of Chatsworth, Calif., but other vendors can produce acceptable bearings. The bearing can rotate about its axis 40 in either direction, as illustrated by the arrows 42 in FIG. 2. The bearing 30 has a size, with respect to a center hole 44 in the sleeve 32, that allows the bearing 30 to be slip fit into the center hole 44. The sleeve 32 preferably comprises case-hardened steel with an expansion coefficient similar to that of the bearing 30.

FIGS. 2 and 3 illustrate the location of the sleeve 32 with respect to the armset 22 and the bearing 30. FIG. 4 is a cross-sectional view of the sleeve 32. The sleeve 30 has the shape of a cylinder, with the center hole 44, and an outer cylindrical surface 46. The sleeve 30 has an outer diameter 48 that is slightly larger than the diameter of a cylindrical bore 50 formed in the armset 22; in other words, an interference fit is provided between the sleeve 32 and the bore 50. When they are assembled, the sleeve 32 is press fitted into the bore 50. The stresses between the sleeve 32 and the bore 50 prevent substantial relative movement during normal operation, so that the sleeve does not move about and get "sloppy" in the bore 50, even as temperature increases to the top of the temperature range. However, some axial relative movement is permitted for thermal expansion, as discussed below.

A coefficient of friction low enough to allow relative movement for thermal expansion differences is provided between the adjoining surfaces 46 and 50 of the sleeve 32 and the bore 50. The sleeve 32 has an anti-friction layer 52 (FIG. 4) deposited thereon. Alternately, an anti-friction layer could be deposited on the bore 50, but this alternative has not been found cost effective. Preferably, the anti-friction layer 52 is a dry coating without migration such as tungsten disulfide (WS$_2$), although other types of layers or coatings, wet or dry, may be suitable. A dry layer is preferable to avoid the possibilities of contamination from leakage, or drying out. WS$_2$, or molybdenum disulfide are particularly preferable for their high stress characteristics similar to the base metal or substrate. The process of depositing the layer 52 can be accomplished by conventional methods such as sputtering or impinging techniques. In the preferred embodiment, tungsten disulfide is used for the layer 52, the minimum thickness is 0.5 micron (20 $\mu$ inches)), and the layer 52 should conform to the military specification DOD-L-85645.

In order to further decrease the coefficient of friction, it has been found that the outer surface 46 of the sleeve 32 should be very symmetrical and smooth, and likewise the bore 50 should be very symmetrical and smooth, so that the adjoining surfaces 46 and 50 do not bind from surface imperfections.

In general, the proper amount of thermal compensation can be chosen by optimizing the coefficient of friction. The coefficient of friction can be optimized by proper choice of the smoothness of the adjacent surfaces 46 and 50, the type of anti-friction layer 52, and the lightness or heaviness of the interference fit. In the preferred embodiment, the smoothness of the bore 50 has a maximum roughness $R_a$ value of 8 microinches, and the outer sleeve surface 46 has a maximum $R_a$ value of 12 microinches. The $R_a$ value is a standard that measures the average variation between the peaks and valleys on the surface. To further smooth the bore 50, for greater smoothness and symmetry, a smooth ball having a diameter very close to the bore 50, is drilled (rotated) through the bore 50. The interference fit should be between 0.0003" to 0.0006", which means that the bore 50 is smaller than sleeve diameter 48 by this amount. This amount of interference provides an optimally tight fit throughout a temperature range of 5° to 50° Centigrade.

The smoothness, the interference fit, and its tolerances can be chosen for use in different or wider temperature ranges. For example, a greater smoothness (smaller $R_a$), tighter tolerances, and a heavier interference may be useful for attaining higher temperature ranges. For example, a $R_a$ of 6 microinches on the bore 50, a $R_a$ of 10 on the outer surface 46 of the sleeve 32, and an interference fit of 0.0005 to 0.0006 will provide a tighter fit and a greater temperature range. However, an excessive interference fit can cause a high coefficient of friction, which will defeat the compensation slippage for thermal expansion. Without the compensation slippage, the arms will spread out from thermal distortion and the heads will move away from their tracks.

In manufacturing, great attention should be paid to detail and cleanliness. The bore 50, and the outer surface 46 of the sleeve 32 should be extremely clean and free of all contaminants in every step of the process. Any residual baked on oils left over from the machining process must be removed. Any methylene chloride left over from the cleaning process must be removed. The relevant portion of the preferred process for making the bore 50 in the armset 22 is as follows:

1. Form the external surfaces of the armset 22 from a block of magnesium, and clean it by ultrasonic means.
2. Drill the bore 50 in the armset 22.
3. Branson clean the bore 50 (Branson cleaning is ultrasonic cleaning with methylene chloride).
4. Remove all traces of the methylene chloride (it can corrode the magnesium).
5. Machine and form the armset 22, making sure the the bore 50 remains clean.
6. Hone the bore 50 with a ball to an $R_a$ value of 8 microinches.
7. Ultrasonic clean the armset 22, and particularly the bore 50, in methylene chloride.
8. Remove all traces of methylene chloride.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. An actuator arm assembly with reduced thermal distortion, said actuator arm assembly comprising:
   an actuator arm having a bore extending therethrough;
   a sleeve positioned within said bore, said sleeve having a size for an interference fit within said bore; and
   an anti-friction material positioned between the outer surface of the sleeve and said bore.

2. The arm assembly as claimed in claim 1, wherein the anti-friction material comprises a layer disposed on the outer surface of the sleeve.

3. The arm assembly as claimed in claim 2, wherein the anti-friction material comprises tungsten disulfide.

4. The arm assembly as claimed in claim 1, wherein the arm comprises a material having a first thermal expansion coefficient, and the sleeve comprises a material having a second thermal expansion coefficient that is different from said first coefficient, and wherein the heaviness of the interference fit between the arm and the sleeve, and the type of anti-friction material, are chosen to provide a coefficient of friction that permits axial slippage during thermal expansion.

5. The arm assembly as claimed in claim 4, wherein the coefficient of friction between the arm and the sleeve is high enough to prevent radial clearance slippage between the arm sleeve and the arm during operation of the arm, yet low enough to permit axial slippage during the thermal expansion of the two materials.

6. A pivotable actuator arm assembly having reduced thermal distortion throughout an operating temperature range, said pivotable actuator arm assembly comprising:
   an actuator arm pivotable about an axis, said arm having a smooth bore aligned with said axis, said smooth bore extending through said arm, said arm including a material having a first expansion coefficient;
   a sleeve having a smooth outer surface with a size for an interference fit within the smooth bore of the arm, said sleeve comprising a material having a second expansion coefficient that is substantially different from the first expansion coefficient of said arm;
   an anti-friction material positioned between the sleeve and the bore; and
   a bearing coupled to said sleeve for rotating said sleeve and said arm as a unit about the axis.

7. The arm assembly as claimed in claim 6, wherein the anti-friction material comprises a layer disposed on the outer surface of the sleeve.

8. The arm assembly as claimed in claim 6; wherein the heaviness of the interference fit between the arm and the sleeve, the type of anti-friction material, and the smoothness of the bore and the outer surface of the sleeve, are chosen to provide a coefficient of friction that permits axial slippage from thermal expansion within the operating temperature range.

9. The arm assembly as claimed in claim 8, wherein the coefficient of friction between the arm and the sleeve is high enough to prevent radial clearance slippage between the sleeve and the arm during operation of the arm within the operating temperature range, yet low enough to permit axial slippage during the thermal expansion of the two materials.

10. The arm assembly as claimed in claim 6, wherein the bearing has a cylindrical shape, and the sleeve has a cylindrical hole provided therein with a size for a slip fit with the cylindrical bearing.

11. A pivotable actuator arm assembly having reduced thermal distortion throughout an operating temperature range, said pivotable actuator arm assembly comprising:

an actuator arm pivotable about an axis, said arm having a smooth bore aligned with said axis, said smooth bore extending through said arm, said arm including a material having a first expansion coefficient;

a sleeve having a smooth outer surface with a size for an interference fit within the smooth bore of the arm, said sleeve comprising a material having a second expansion coefficient that is substantially different from the first expansion coefficient of said arm;

an anti-friction material positioned between the sleeve and the bore, wherein the anti-friction material comprises a layer of tungsten disulfide disposed on the outer surface of said sleeve; and a bearing coupled to said sleeve for rotating said sleeve and said arm as a unit about the axis.

12. The arm assembly as claimed in claim 11, wherein the interference fit between the arm and the sleeve, the type of anti-friction material, and the smoothness of the bore and the outer surface of the sleeve, are chosen to provide a coefficient of friction that permits axial slippage from thermal expansion within the operating temperature range.

13. The arm assembly as claimed in claim 12, wherein the coefficient of friction between the arm and the sleeve is high enough to prevent radial clearance slippage between the sleeve and the arm during operation of the arm within the operating temperature range, yet low enough to permit axial slippage during the thermal expansion of the two materials.

14. The arm assembly as claimed in claim 11, wherein the bearing includes a cylindrical cartridge bearing, and the sleeve has a cylindrical hole provided therein with a size for a slip fit with the cylindrical cartridge bearing.

15. An armset assembly for a pivotable actuator that includes one or more heads for reading from, or writing to, one or more storage disks, said armset assembly being pivotable about an axis to access one of a number of tracks provided on the storage disks, said armset assembly comprising:

an armset having one or more arms, each arm having means for mounting one or more heads thereon, said armset comprising a material having a first expansion coefficient, said material having low density relative to its strength so that it has a low inertia;

a smooth cylindrical bore formed within said armset, said smooth bore extending through the armset, said smooth bore being aligned with the pivotal axis of the actuator;

a cylindrical sleeve having a size for an interference fit within the bore of the armset, said sleeve comprising a hard, durable, heat-treatable material having a second expansion coefficient that is less than the first expansion coefficient;

an anti-friction layer on the outside surface of the sleeve; and, a cartridge bearing positioned axially within the sleeve, so that the armset is rotatable about its axis.

16. The armset assembly as claimed in claim 15, wherein the anti-friction layer comprises tungsten disulfide.

17. The armset assembly as claimed in claim 15, wherein the heaviness of the interference fit between the arm and the sleeve, the type of anti-friction material, and the smoothness of the bore and the outer surface of the sleeve, are chosen to provide a coefficient of friction that permits axial slippage from thermal expansion.

18. The armset assembly as claimed in claim 17, wherein the coefficient of friction between the arm and the sleeve is high enough to prevent radial clearance slippage between the sleeve and the arm during operation of the arm, yet low enough to permit axial slippage during the thermal expansion of the two materials.

* * * * *